United States Patent
Gramkow et al.

(10) Patent No.: US 10,677,105 B2
(45) Date of Patent: Jun. 9, 2020

(54) CAMSHAFT FOR AN INTERNAL COMBUSTION ENGINE

(71) Applicant: Daimler AG, Stuttgart (DE)

(72) Inventors: Thomas Gramkow, Berlin (DE); Markus Wuensch, Heubach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/467,801

(22) PCT Filed: Sep. 27, 2017

(86) PCT No.: PCT/EP2017/001152
§ 371 (c)(1),
(2) Date: Jun. 7, 2019

(87) PCT Pub. No.: WO2018/103871
PCT Pub. Date: Jun. 14, 2018

(65) Prior Publication Data
US 2019/0323387 A1 Oct. 24, 2019

(30) Foreign Application Priority Data
Dec. 10, 2016 (DE) .......... 10 2016 014 768

(51) Int. Cl.
*F01L 1/047* (2006.01)
*F16D 3/06* (2006.01)
*F16H 53/04* (2006.01)

(52) U.S. Cl.
CPC .......... *F01L 1/047* (2013.01); *F16D 3/06* (2013.01); *F16H 53/04* (2013.01); *F01L 2001/0473* (2013.01)

(58) Field of Classification Search
CPC ..... F01L 2001/0473; F01L 1/053; F01L 1/46; F01L 2013/0052; F01L 2810/04; F16D 3/06
USPC ............................. 123/90.18, 90.27
See application file for complete search history.

(56) References Cited

U.S. PATENT DOCUMENTS

2005/0107169 A1* 5/2005 Sakurai .......... F16D 1/06
464/179
2014/0080614 A1* 3/2014 Nabeshima .......... B62D 1/185
464/162

FOREIGN PATENT DOCUMENTS

| DE | 10 2008 064 340 A1 | 6/2010 |
|----|---|---|
| DE | 10 2009 022 657 A1 | 1/2011 |
| DE | 10 2011 001 659 A1 | 10/2012 |
| EP | 0 606 820 B1 | 7/1994 |
| WO | WO 2010/012371 A1 | 2/2010 |

(Continued)

OTHER PUBLICATIONS

PCT/EP2017/001152, International Search Report dated Jan. 2, 2018 (Three (3) pages).

*Primary Examiner* — Jorge L Leon, Jr.
(74) *Attorney, Agent, or Firm* — Crowell & Moring LLP

(57) ABSTRACT

A camshaft for an internal combustion engine has a fundamental shaft which has a first toothing designed as external toothing and has at least one cam element which is arranged on the fundamental shaft and has a second toothing designed as internal toothing, The cam element can be displaced in the axial direction relative to the fundamental shaft and is connected to the fundamental shaft in a rotationally fixed manner via the toothings. At least one of the toothings has teeth whose respective tooth width varies in the axial direction of the fundamental shaft.

3 Claims, 2 Drawing Sheets

(56) References Cited

FOREIGN PATENT DOCUMENTS

WO     WO 2010/142408 A1    12/2010

\* cited by examiner

CAMSHAFT FOR AN INTERNAL COMBUSTION ENGINE

BACKGROUND AND SUMMARY OF THE INVENTION

The invention relates to a camshaft for an internal combustion engine, in particular a motor vehicle.

Such a camshaft for an internal combustion engine, in particular a motor vehicle, is already known from DE 10 2009 022 657 A1, for example. The camshaft comprises a fundamental shaft which has a first toothing in the form of an external toothing. Furthermore, the camshaft comprises at least one cam element which is arranged on the fundamental shaft and has a second toothing formed as internal toothing. The cam element can be displaced in the axial direction relative to the fundamental shaft and is connected to the fundamental shaft in a rotationally fixed manner via the gear teeth so that, for example, torques can be transmitted between the cam element and the fundamental shaft via the gear teeth. The fundamental shaft, for example, is a drive shaft from which the cam element, which functions as an output shaft, can be driven. In particular, the cam element is used to actuate at least one gas exchange valve of the internal combustion engine, in particular to open it.

In addition, EP 0 606 820 B1 reveals a tension anchorage for at least one tension element running inside a cooling tube, with an anchor plate supported on a building component.

From the WO 2010 12 371 A1 a toothed shaft connection between a hollow shaft or hub provided with an internal toothing and a shaft provided with an external toothing is known. In order to achieve radial backlash compensation in the splined shaft connection or to enable radial bearing and centering of the hollow shaft or hub on the shaft, it is suggested there that the two toothings lie opposite each other over a part of their length in the region of a tip diameter and/or a root diameter of the external toothing with clearance fit and lie opposite to each other in the region of adjacent tooth flanks of the internal and external toothing at a greater distance, and in that the two toothings lie opposite to one another over another part of their length in the region of the adjacent tooth flanks of the internal and external toothing with clearance fit, while in the region of the tip circle diameter and the root circle diameter they lie opposite one another of the external toothing with radial clearance. The tooth shaft connection is preferably arranged between a camshaft and cam carriers of a valve train for gas exchange valves of an internal combustion engine which can be displaced on the camshaft.

From DE 10 2008 064 340 A1 a valve train for gas exchange valves of an internal combustion engine is known, with a basic camshaft and several axially displaceable and radially guided cam carriers on the basic camshaft, wherein the base camshaft has for each cam carrier at least one external toothing portion and each cam carrier at least one internal toothing portion meshing with the external toothing portion of the base camshaft, and wherein the base camshaft has cylindrical shaft portions between adjacent external toothing portions. To facilitate the manufacture of the ground camshaft, it is suggested that each cam carrier be radially guided on at least one of the cylindrical shaft sections.

The object of this invention is to further develop a camshaft of the type mentioned above in such a way that a particularly advantageous noise behavior can be achieved.

In order to further develop a camshaft of this type in such a way that a particularly advantageous noise behavior can be achieved, it is provided in accordance with the invention that at least one of the toothings has teeth whose respective tooth width, running in particular in the circumferential direction of the fundamental wave, varies in the axial direction of the fundamental wave. This can at least limit the backlash between the toothings in at least one position of the cam element relative to the fundamental shaft, therefore significantly reducing the generation of unwanted tooth noise compared to conventional camshafts. At the same time, sufficient mobility of the toothing and therefore of the cam element relative to the fundamental shaft can be achieved so that the cam element can be shifted axially relative to the fundamental shaft.

The invention is based in particular on the knowledge that this displacement of the cam element relative to the fundamental shaft usually requires a minimum clearance, which is usually ensured by a toothing clearance between the toothings. In addition, tolerances, i.e., so-called manufacturing tolerances, occur due to the manufacturing process, which further increase the backlash. It was found that the backlash is exponentially integrated into the acoustic behavior of the camshaft, so that undesirable impulse noises can occur if the backlash is undesirable. Such unwanted impulsive noises can now be avoided with the invented camshaft, since the backlash, especially in at least one position of the cam element relative to the fundamental shaft, can be kept particularly low while at the same time realizing the displaceability of the cam element relative to the fundamental shaft.

For example, the cam element can be moved between at least two positions relative to the fundamental shaft and can therefore be moved in the axial direction of the fundamental shaft relative to it in a translatory manner. These positions are preferably end settings or end positions, wherein the cam element can be moved axially to the respective end position relative to the fundamental shaft, but not beyond it. Due to the varying tooth width, it is possible, at least in the end settings, to keep the backlash particularly low and at the same time to ensure the displaceability of the cam element relative to the fundamental shaft, so that a particularly advantageous function and noise behavior of the camshaft can be achieved.

Further advantages, features and details of the invention result from the following description of a preferred design example as well as from the drawings. The features and combinations of features mentioned above in the description as well as the features and combinations of features mentioned below in the description of the figures and/or shown to the figures alone can be used not only in the combination indicated in each case, but also in other combinations or in a unique position without leaving the scope of the invention.

DETAILED DESCRIPTION OF THE DRAWINGS

In the figures, identical or functionally identical elements are provided with the same reference signs.

Figure 1:
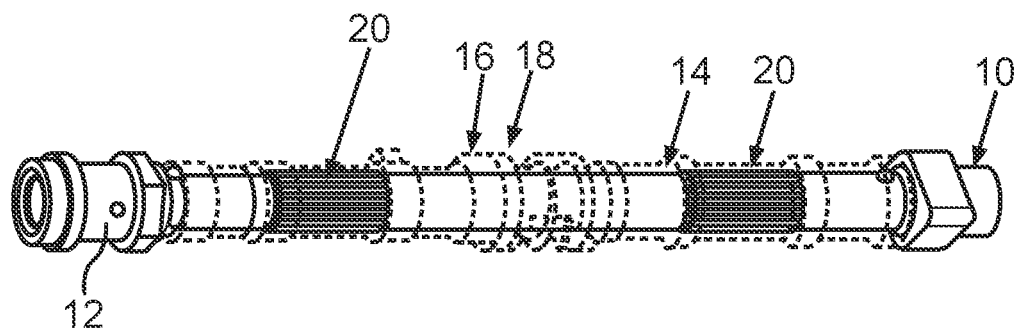
FIG. 1 shows a schematic perspective view of an invented camshaft for an internal combustion engine.

FIG. 1 shows, in a schematic perspective view, a camshaft for an internal combustion engine of a motor vehicle which is drivable, for example, by means of the internal combustion engine, which is designated 10 in its entirety. The internal combustion engine is designed as a reciprocating piston engine and has at least one combustion chamber designed as a cylinder, to which at least one gas exchange valve is assigned. In particular, a plurality of gas exchange valves is associated with the combustion chamber, of which at least one gas exchange valve is designed as an inlet valve and a further gas exchange valve is designed as an outlet valve. The so-called charge change of the cylinder is controlled by means of the gas exchange valves. In the following, the camshaft 10 is explained using the example of one of the gas exchange valves, wherein the previous and following versions of one gas exchange valve can also be easily transferred to any other gas exchange valves.

The camshaft 10 is used to operate the gas exchange valve, i.e., to open it. The gas exchange valve is held in translatory motion on a cylinder head of the internal combustion engine, wherein the gas exchange valve can be moved in translatory motion relative to the cylinder head between a closed position and at least two different open positions. The camshaft 10 is used to move the gas exchange valve from the closed position to the respective open position. For this purpose the camshaft 10 comprises a fundamental shaft 12, which is also referred to as a flanged shaft or drive shaft. Furthermore, the camshaft 10 comprises at least one cam element 14, which is also referred to as a camshaft bushing and is, for example, an output shaft or functions as an output shaft of the camshaft 10.

When moving the gas exchange valve from the closed position to a first of the open positions, the gas exchange valve performs a first stroke. When moving the gas exchange valve from the closed position to the second open position, the gas exchange valve performs a larger second stroke than the first stroke, so that, for example, the first open position is located between the closed position and the second open position. The camshaft 10 is used to switch between the strokes of the gas exchange valve so that the camshaft 10 is used, for example, in a valve lift switchover system. This changeover between the strokes is also known as stroke changeover and takes place as part of the respective valve stroke switching process.

Here the cam element 14, which is shown transparently in FIG. 1, is arranged on the fundamental shaft 12 and can be moved in the axial direction of the fundamental shaft 12 relative to it in a translatory manner between at least two mutually different positions, i.e., can be displaced. The camshaft 10 is mounted on the cylinder head so that it can rotate about an axis of rotation relative to the cylinder head when the internal combustion engine is completely manufactured. The internal combustion engine comprises at least one output shaft which is designed, for example, as a crankshaft and is mounted on a further housing element so as to be rotatable about a second axis of rotation relative to the further housing element. For example, the axes of rotation run at least substantially parallel to one another. The camshaft 10, in particular the fundamental shaft 12, can be driven by the output shaft, in particular via a drive system. The drive system is, for example, a traction drive, which can be designed as a belt drive or as a chain drive. Furthermore, the drive system can be a gear drive.

The cam element 14, for example, has a first cam 16 and a second cam 18 following the cam 16 in the axial direction of the cam element 14 and therefore of the fundamental shaft 12. The gas exchange valve can be operated by means of the respective cam 16 or 18, wherein, for example, the first stroke and therefore the first open position can be effected by means of cam 16 and the second stroke and therefore the second open position can be effected by means of the second cam 18. The gas exchange valve, for example, can be actuated at least indirectly by means of the respective cam 16 or 18, wherein it can be provided that the gas exchange valve can be actuated by means of the respective cam 16 or 18, for example by means of an actuating element not shown in more detail in the Fig. The actuating element is, for example, a plunger or a rocker arm.

In order to effect the first stroke and therefore the first open position of the gas exchange valve, the cam element 14, for example, is moved to one of the first positions. In the first position, the gas exchange valve can be operated by means of the first cam 16. In the first position, the gas exchange valve is not operated by means of cam 18. To effect the second stroke, for example, the cam element 14 is moved to the second position. In the second position, the gas exchange valve can be actuated by means of the second cam 18, with the gas exchange valve not being actuated by the first cam 16. The positions are respective end positions or end positions, so that the cam element 14 can be moved in the axial direction of the fundamental shaft 12 relative to it to the respective end position, but not beyond it. Therefore, the cam element 14 is axially displaceably mounted on the fundamental shaft 12.

Figure 2:
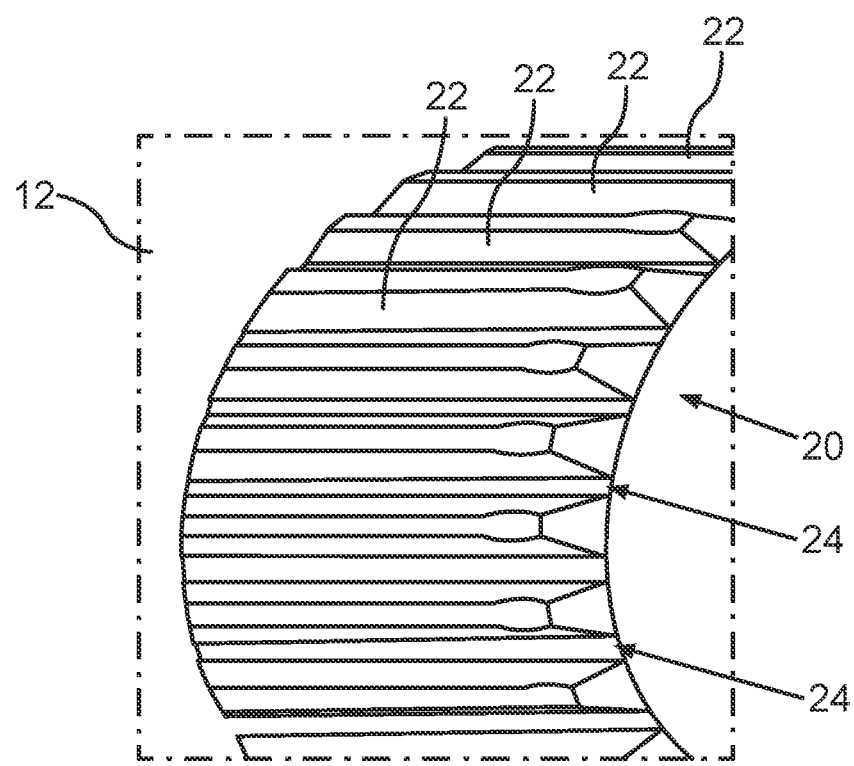
FIG. 2 shows a schematic perspective view of a fundamental shaft of the camshaft.

In order to actuate the gas exchange valve by means of the respective cam 16 or 18, the cam element 14 is rotated about the first axis of rotation relative to the gas exchange valve or relative to the actuating element. For this purpose, the cam element 14 is driven by the fundamental shaft 12 and thereby rotated about the first axis of rotation. For this purpose, the fundamental shaft 12 has at least one first toothing 20 which can be seen particularly well from FIG. 2 and which is designed as an external toothing. The external toothing has a plurality of first teeth 22 arranged successively and at a distance from one another in the circumferential direction of the fundamental shaft 12, between which respective tooth gaps 24 of the first toothing 20 are arranged.

Figure 4:
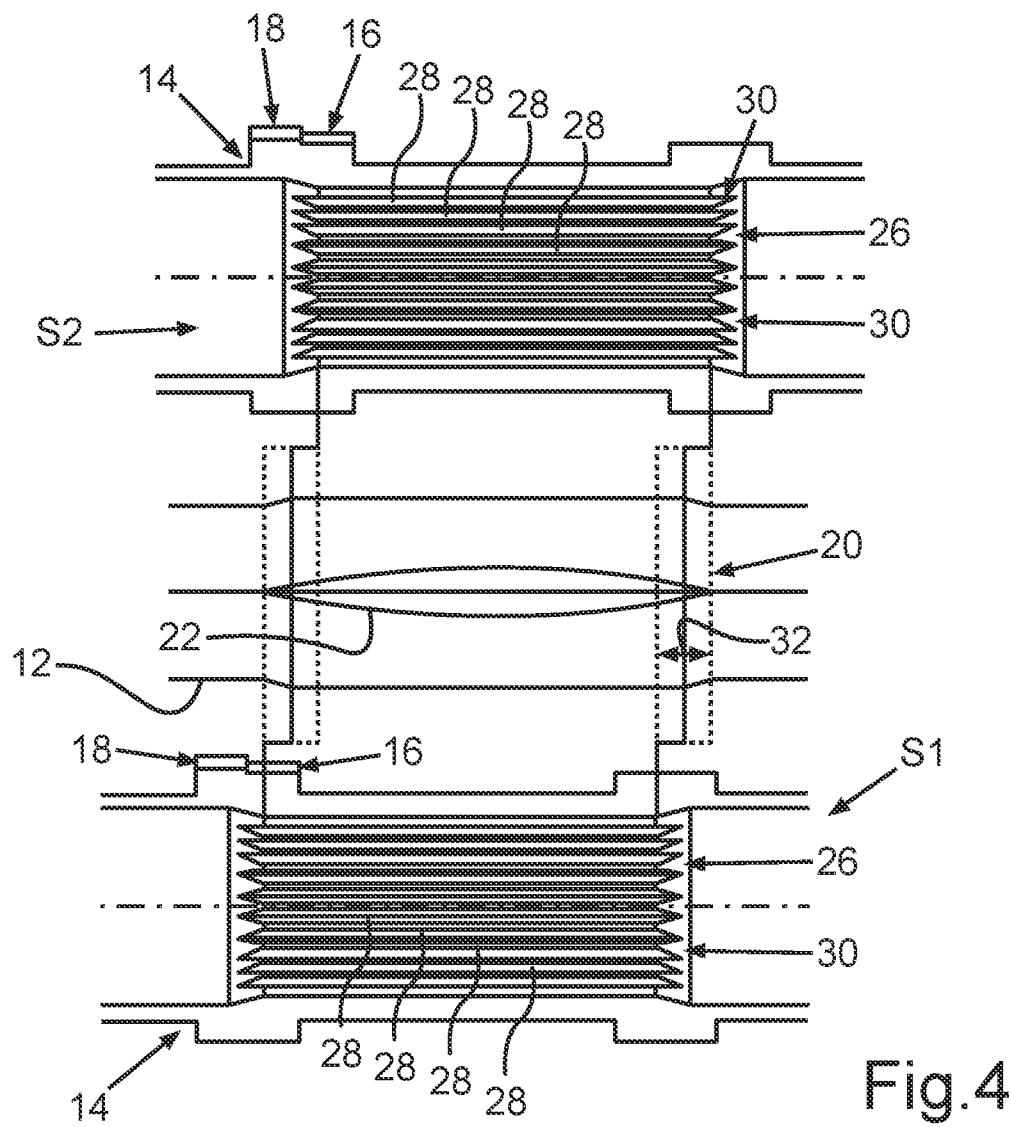
FIG. 4 shows schematic sectional views or a schematic top view of the fundamental shaft and a cam element of the camshaft, wherein two positions of the cam element are shown in FIG. 4.

In conjunction with FIG. 4, it is particularly easy to see that the cam element 14 has a second toothing 26 which is designed as an internal toothing and comprises a plurality of teeth 28 arranged successively and spaced apart from one another in the circumferential direction of the fundamental shaft 12 and therefore of the cam element 14. Furthermore, the toothing 26 also comprises respective tooth gaps 30 arranged between the second teeth 28. In the completely manufactured state of the camshaft 10, the toothing 20 and 26 engage with each other so that the teeth 22 engage in the tooth gaps 30 and the teeth 28 engage in the tooth gaps 24. This means that the cam element 14 is connected to the fundamental shaft 12 in a rotationally fixed manner via the toothing 20 and 26, so that torques can be transmitted between the cam element 14 and the fundamental shaft 12, in particular from the fundamental shaft 12 to the cam element 14, via the toothing 20 and 26. As a result, the cam element 14 can be driven and therefore rotated about the first axis of rotation.

Figure 3:
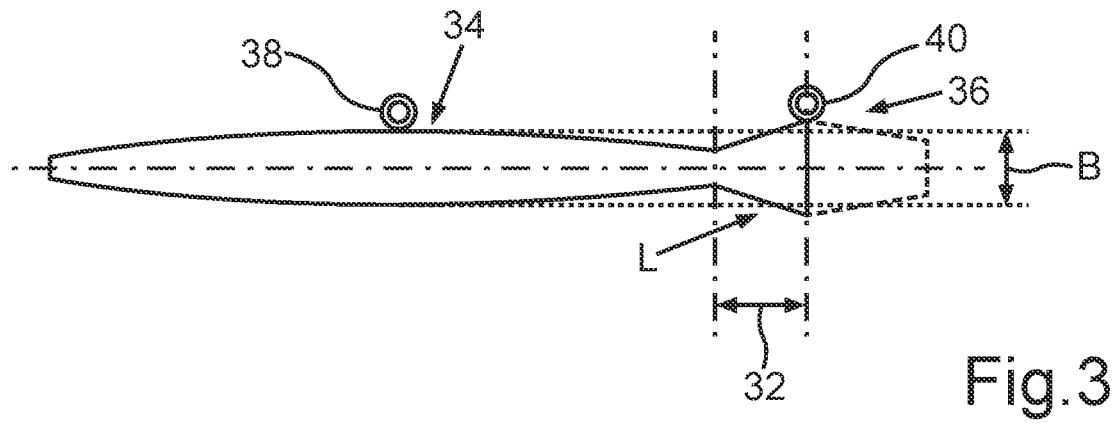
FIG. 3 shows a sectional schematic top view of a tooth of the fundamental.

FIG. 4 shows the two positions in which the cam element 14 can be moved relative to the fundamental shaft 12. The first position is designated S1, while the second position is designated S2. Since in the first position S1 the first stroke is set to a lower value than the second stroke, the first position is also referred to as the low stroke position and the first stroke is also referred to as the low stroke (NH). Consequently, the second position S2 is called the high stroke position and the second stroke is called the high stroke (HH). In FIGS. 3 and 4, a double arrow 32 illustrates a displacement path by which the cam element 14 is displaced in the axial direction of the fundamental shaft 12 relative to it in order to move the cam element 14 from end position to end position. The positions S1 and S2 are therefore respective switching positions or switching positions in which the cam element 14 can be moved relative to the fundamental shaft 12.

In order to be able to implement a particularly advantageous noise behavior of the camshaft 10 and therefore of the internal combustion engine of the motor vehicle as a whole, the teeth 22 of the toothing 20 and/or the teeth 28 of the toothing 26 have a respective tooth width which runs in particular in the circumferential direction of the fundamental shaft 12 or of the cam element 14 and which is also referred to as width and varies in the axial direction of the fundamental shaft 12 and therefore of the cam element 14. FIG. 3 shows one of the teeth 22 in a schematic plan view. The width of tooth 22 shown in FIG. 3 is marked B in FIG. 3, so that in FIG. 3 it is particularly easy to see that the width B or its values vary in the axial direction of the fundamental shaft 12 and therefore in the longitudinal direction of the tooth 22. The previous and following explanations for tooth 22 and toothing 20 can easily be transferred to tooth 28 and toothing 26 and vice versa.

FIG. 3 clearly shows that tooth 22, for example, is designed as a trumpet tooth, so that toothing 20, for example, is designed as a trumpet tooth. Tooth 22 has at least one length range L, which widens wedge-shaped in axial direction. Furthermore, tooth 22 has a first partial region 34 and a second partial region 36 following the first partial region 34 in the axial direction, wherein the partial regions 34 and 36 are, for example, respective length areas of tooth 22. In the first partial region 34, the width B has a first value, the width B in the second partial region 36 having a second value greater than the first value. For example, the second value is 10 microns greater than the first value, so that tooth 22 in the second partial region 36 is wider than in the first partial region 34. The respective partial regions 34 and 36 is a contact area, so that the partial region 34 is a first contact area and the partial region 36 is a second contact area. In the contact areas, contact points 38 and 40 are provided where the gear teeth 20 and 26 are in mutual contact in the respective end positions. For example, it is provided that the toothing 20 and 26 are in mutual contact in the first position S1 via the first contact area and in the second position S2 via the second contact area, wherein for example the toothing 20 and 26 are not in mutual contact in the first position S1 via the second contact area and in the second position S2 via the first contact area.

The camshaft 10 is therefore designed to separate the contact areas with regard to the end positions, so that the first contact area, for example, is a low stroke area and the second contact area is a high stroke area. This means that any backlash between toothing 20 and 26 can be kept particularly low in the end positions so that no unwanted noise is generated. The end positions are so-called gearing end positions in which the toothing 20 and 26 come to rest. At the same time, the varying width B ensures sufficient backlash for the displacement of the cam element 14 relative to the fundamental shaft 12, so that the cam element 14 can be displaced relative to the fundamental shaft 12. In other words, trumpet toothing allows on the one hand to keep the backlash in the end positions particularly low and on the other hand to realize a backlash sufficient for the shifting process so that the cam element 14 can be shifted advantageously and especially low-friction relative to the fundamental shaft 12.

Since the width B in partial region 36 has a greater value than in partial region 34, a tooth thickness increase is provided in partial region 36 compared to partial region 34. Furthermore, the width B in the partial region 34 has a greater value than in at least one third partial region of tooth 22 adjoining the partial region 34, which is different from the partial regions 34 and 36 and, for example, arranged in the axial direction between the partial regions 34 and 36, so that in the partial regions 34 and 36 an increase in tooth thickness is realized in relation to the third partial region. As a result, the backlash between the toothing 20 and 26 can be kept particularly low in the end positions, so that undesired noises do not occur, especially in the end positions.

LIST OF REFERENCE CHARACTERS

10 Camshaft
12 Fundamental shaft
14 Cam element
16 First cam
18 Second cam
20 First toothing
22 First tooth
24 Tooth gap
26 Second toothing
28 Second tooth
30 Tooth gap
32 Double arrow
34 Partial region
36 Partial region
38 Contact point
40 Contact point
B Width
L Length range
S1 First position
S2 Second position

The invention claimed is:

1. A camshaft for an internal combustion engine, the camshaft comprising:
a fundamental shaft which has a first toothing constructed as external toothing; and
a cam element which is disposed on the fundamental shaft and which has a second toothing constructed as internal toothing, wherein the cam element is configured to be displaced in an axial direction relative to the fundamental shaft and is connected to the fundamental shaft in a rotationally fixed manner via the external toothing and the internal toothing;
wherein at least one of the external toothing and the internal toothing has teeth with a respective tooth width that varies in the axial direction;
wherein the teeth each have at least one length range which widens wedge-shaped in the axial direction.

2. The camshaft according to claim 1, wherein the teeth each have a first contact region in which the tooth width has a first value and a second contact region following the first contact region in the axial direction in which the tooth width has a second value which is greater than the first value.

3. The camshaft according to claim 2, wherein the cam element is configured to be displaced in the axial direction between a first position and a second position relative to the fundamental shaft, wherein the external toothing and the internal toothing in the first position are in mutual contact via the first contact region, wherein the external toothing and the internal toothing in the second position are in mutual contact via the second contact region, wherein the cam element has a first cam configured to effect a first stroke of a gas exchange valve of the internal combustion engine and a second cam configured to effect a second stroke of the gas exchange valve, wherein the second stroke is greater than the first stroke, and wherein the gas exchange valve is actuated in the first position by the first cam and in the second position by the second cam.

* * * * *